United States Patent [19]

Parsons et al.

[11] Patent Number: 4,944,913
[45] Date of Patent: Jul. 31, 1990

[54] ABRASIVE AND WEAR RESISTANT MATERIAL

[76] Inventors: Stephen A. Parsons, 199 Downham Avenue, Mondeor, Johannesburg, Transvaal; Henry B. Dyer, 28 George Street, Bryanston, Transvaal, both of South Africa; John Dodsworth, 1 Manor Close, Trimdon Village, County Durham, United Kingdom

[21] Appl. No.: 449,472

[22] Filed: Dec. 11, 1989

Related U.S. Application Data

[63] Continuation of Ser. No. 368,968, Jun. 19, 1989, abandoned, which is a continuation of Ser. No. 219,907, Jul. 18, 1988, abandoned, which is a continuation of Ser. No. 84,384, Aug. 11, 1987, abandoned.

[30] Foreign Application Priority Data

Aug. 11, 1986 [ZA] South Africa .................. 86/6005

[51] Int. Cl.$^5$ ............................. B22F 3/00
[52] U.S. Cl. ............................. 419/13; 75/238
[58] Field of Search ............ 75/238; 419/17, 13

[56] References Cited

U.S. PATENT DOCUMENTS

| | | | |
|---|---|---|---|
| 4,342,595 | 8/1982 | Bourdeau | 75/238 |
| 4,596,693 | 6/1986 | Ishizuka et al. | 419/16 |
| 4,647,546 | 3/1987 | Hall et al. | 75/238 |
| 4,650,776 | 3/1987 | Cerceau et al. | 75/238 |
| 4,693,746 | 9/1987 | Nakai et al. | 75/238 |

FOREIGN PATENT DOCUMENTS

| | | |
|---|---|---|
| 87307069 | 6/1986 | European Pat. Off. |
| 55-32546 | 10/1981 | Japan |
| 56-130451 | 10/1981 | Japan |
| 56-1742 | 7/1982 | Japan |
| 57-116742 | 7/1982 | Japan |

OTHER PUBLICATIONS

Patent Abstracts of Japan, vol. 6, No. 7 (C-87) [885], 1/16/82 & JP-A-56 130 451.
Patent Abstracts of Japan, vol. 6, No. 208 (C-130) [1086], 10/20/82 & JP-A 57 116 742.
Patent Abstracts of Japan, vol. 10, No. 17 (C-324) [2074], 1/23/86 & JP-A 60 169 533.
Patent Abstracts of Japan, vol. 10, No. 36 (C-328) [2093], 2/13/86 & JP-A 60 187 659.
Patent Abstracts of Japan, vol. 10, No. 182 (C-356) [2238], 6/25/86 & JP-A-61 30 641.

*Primary Examiner*—Stephen J. Lechert, Jr.
*Attorney, Agent, or Firm*—Scully, Scott, Murphy & Presser

[57] ABSTRACT

A cemented carbide which contains less than 20 weight percent of cubic boron nitride particle. The material is abrasive and wear resistant. The material is produced under cubic boron nitride synthesis conditions.

10 Claims, No Drawings

ABRASIVE AND WEAR RESISTANT MATERIAL

This application is a continuation, of application Ser. No. 368,968, filed Jun. 19, 1989, now abandoned. Which is a continuation of U.S. patent application Ser. No. 219,907 filed Jul. 18, 1988 now abandoned which is a continuation of U.S. patent application Ser. No. 084,384 filed Aug. 11, 1987 now abandoned.

BACKGROUND OF THE INVENTION

This invention relates to an abrasive and wear resistant material.

Cemented carbide is a material which is used extensively in industry for a variety of applications, both as an abrading material and a wear resistant material. Cemented carbides generally consist of suitable carbide particles such as tungsten carbide, tantalum carbide or titanium carbide bonded together by means of a metal such as cobalt, iron or nickel or alloy thereof. Typically, the metal content of cemented carbides is 3 to 35 percent by weight. They are produced by sintering the carbide particles and metal to temperatures of the order of 1400° C.

Cemented carbides are used as supports for diamond and cubic boron nitride compacts. In such abrasive products it is an edge of the compact which performs the abrading operation in use. During abrading operations, abrasive chips may strike against the carbide support and cause undercutting in that region weakening the product. A typical example of this can be found in drilling using an insert comprising an elongate cemented carbide pin on the end of which is mounted a diamond compact. Undercutting of the pin immediately behind the compact occurs.

SUMMARY OF THE INVENTION

According to the present invention, there is provided an abrasive and wear resistant material comprising a mass of carbide particles, a mass of cubic boron nitride particles and a bonding metal or alloy bonded into a coherent, sintered form, the cubic boron nitride particle content of the material not exceeding 20 per cent by weight and the material being substantially free of hexagonal boron nitride.

Further according to the invention, there is provided a method of producing a material as described above, including the steps of contacting a mass of carbide particles and a mass of cubic boron nitride particles with the bonding metal or alloy, and sintering the particles and metal or alloy under conditions such that formation of hexagonal boron nitride is inhibited.

DETAILED DESCRIPTION OF THE INVENTION

The material is, in effect, a cemented carbide which has been modified by the addition of the cubic boron nitride particles. The addition of these particles provides the cemented carbide with greater abrasive and wear resistant properties.

The material must be substantially free of hexagonal boron nitride, i.e. the degraded form of cubic boron nitride. The presence of any significant quantity of hexagonal boron nitride reduces the abrasive and wear resistant properties of the material. In producing the material, it is important that conditions are chosen which achieve this.

Sintering of the particles and metal or alloy may take place at elevated temperature, typically a temperature exceeding 1350° C., under carefully controlled non-oxidising conditions. The non-oxidising conditions may be provided by a vacuum, for example a vacuum of less than 1 mbar.

The preferred method of sintering involves sintering under conditions of elevated temperature and pressure at which cubic boron nitride is crystallographically stable. Typically these conditions involve temperatures of the order of 1400°–1600° C. and pressures of the order of 50–70 kbars. These conditions may be maintained for a period of 5 to 30 minutes.

The metal or alloy is preferably provided in powdered form. This powdered form may then be mixed with the carbide and cubic boron nitride particles. The mixture may be sintered as such or cold pressed to produce a weak, but coherent, body prior to sintering.

For high temperature/high pressure sintering, a conventional high temperature/high pressure apparatus will be used. The mixture mentioned above can be loaded directly into the reaction capsule of such an apparatus. Alternatively, the mixture can be placed on a cemented carbide support or a recess formed in a carbide support and loaded in this form into the capsule. A layer of a material such as molybdenum or tantalum must be placed between the carbide support and the mixture to facilitate removal of the sintered material from support after sintering and prevent metal from the support infiltrating into the mixture.

The carbide particles and metal or alloy may be any used in the manufacture of conventional cemented carbides. Examples of suitable carbides are tungsten carbide, tantalum carbide, titanium carbide and mixtures thereof. Examples of suitable metals and alloys are cobalt, iron, nickel and alloys containing one or more of these metals. Preferably, the metal will be cobalt and the carbide will be tungsten carbide.

The cubic boron nitride particles may be fine or coarse. The coarser the particle the less the tendency for it to be degraded during sintering.

The cubic boron nitride particle content of the material is typically in the range 5–5 percent by weight. The metal or alloy content of the material will typically be in the range 5–15 percent by weight.

It has been found that if the particles and metal or alloy have volatiles removed from them, e.g. by heating them in a vacuum, and are then vacuum sealed by, for example, electron beam welding prior to sintering, then materials of improved abrasiveness and wear resistance are produced. The vacuum may, for example, be a vacuum of 1 mbar or less and the heating may be at a temperature in the range 500° C. to 1200° C.

The material of the invention may be used as an abrasive for abrading materials, e.g. by cutting. The material may also be used as a wear resistant material, particularly in tool components or inserts which consist of an abrasive compact bonded to a cemented carbide support. Typically, the material will be used for producing the support or at least a region or zone of the carbide support which is subjected to wear or abrasive action from chips during use. An example of such a tool insert is a drill bit insert.

The invention will now be illustrated by reference to the following examples.

EXAMPLE 1

A mass of cubic boron nitride particles was thoroughly mixed with a mass of tungsten carbide particles and powdered cobalt to produce a uniform mixture of the particles. The mixture was cold-pressed to form a weak, but coherent, slug. This slug was loaded into the reaction capsule of a standard high pressure/high temperature apparatus and the loaded capsule placed in the reaction zone of this apparatus. The contents of the capsule were subjected to a temperature of 1450° C. and a pressure of about 50 kbars and these elevated conditions of temperature and pressure were maintained for a period of 10 minutes. Recovered from the reaction capsule was a coherent, bonded material of good wear resistance. The cobalt content of the material was 11 percent by weight on the basis of the cobalt/carbide mixture.

Using this method a variety of materials were produced using cubic boron nitride of different particle sizes. The materials were all found to have good toughness—i.e. an ability to prevent propagation of cracks—and excellent hardness. The abrasion resistance of the materials was tested by silica flour filled epoxy resin turning tests, using the following cutting conditions:

Sample format: 90° quadrant 3.2 mm thick
Tool holder: neutral
Rate angle: 0°
Clearance angle: 6°
Cutting speed: 10 m/min
Depth of cut: 1.0 mm
Feed rate: 0.3 mm/rev
Test duration: 30 s The results obtained are set out in the table below.

TABLE I

| CBN Grade used (microns) | FLANK WEAR (mm) WC—Co/CBN ratio | |
|---|---|---|
| | 90:10 | 85:15 |
| 30–60 | 0.28 | 0.22 |
| 15–30 | 0.21 | 0.23 |
| 8–20 | 0.20 | 0.19 |
| 6–12 | 0.17 | 0.19 |
| 4–8 | 0.19 | 0.19 |
| 0.5–3 | 0.21 | 0.25 |

EXAMPLE 2

A further series of bonded, coherent materials were prepared using the method of Example 1, save that the mixture was not cold-pressed ans was heated at 700° C. in a vacuum of less than 1 mbar to remove volatiles and then vacuum sealed in the capsule prior to insertion of the capsule into the reaction zone of the high pressure/high temperature apparatus. The materials were subjected to the same turning test set out in Example 1 and the results obtained are recorded in Table II.

TABLE II

| CBN Grade used (microns) | FLANK WEAR (mm) WC—Co/CBN ratio | | |
|---|---|---|---|
| | 5 | 10 | 15 |
| 0.5–3 | 0.086 | 0.077 | 0.045 |
| 4–8 | 0.096 | 0.109 | 0.067 |
| 6–12 | 0.096 | 0.080 | 0.074 |
| 8–20 | 0.120 | 0.093 | 0.080 |
| 15–30 | 0.120 | 0.090 | 0.109 |

TABLE II-continued

| CBN Grade used (microns) | FLANK WEAR (mm) WC—Co/CBN ratio | | |
|---|---|---|---|
| | 5 | 10 | 15 |
| 30–60 | 0.120 | 0.106 | 0.126 |

It will be noted that the wear flanks recorded (in mm) for the materials of Table II are lower than those for materials of Table I. The lower the wear flank the more abrasion resistant the material. These results demonstrate the importance of the removal of volatiles from the particulate material prior to sintering.

EXAMPLE 3

A further series of materials were produced following the procedure of Example 2 except that the cobalt content was also varied. The materials produced were subjected to the turning test set out in Example 1 and the results obtained are recorded in Table III.

TABLE III

| CBN:WC (by volume) | Co (by volume) | |
|---|---|---|
| | 5 | 10 |
| 20:80 | 0.096 | 0.167 |
| 30:70 | 0.080 | 0.135 |
| 40:60 | 0.064 | 0.144 |
| 50:50 | 0.061 | 0.077 |

EXAMPLE 4

A mass of cubic boron nitride particles was thoroughly mixed with a mass of tungsten carbide particles and powdered cobalt to produce a uniform mixture of the particles. The mixture was sintered at a temperature of about 1400° C. in a vacuum of 0.12 mbars for about one hour producing a coherent bonded material. The material was allowed to cool to ambient temperature. The cobalt content of the material was 11 percent by weight on the basis of the Co-carbide mixture.

Using this method materials containing 5 percent and 10 percent by weight cubic boron nitride were produced and using two different particles sizes—the one 1.5 to 3 microns and the other 30 to 60 microns. It was found that the sintered materials using the coarser particles exhibited less hexagonal boron nitride formation than those using the finer particles.

We claim:

1. A method of producing an abrasive and wear resistant material consisting essentially of a mass of carbide particles, a mass of cubic boron nitride particles and a bonding metal or alloy bonded into a coherent, sintered form, the cubic boron nitride particle content of the material not exceeding 20 percent by weight and the material being substantially free of hexagonal boron nitride, including the steps of contacting a mass of carbide particles and a mass of cubic boron nitride particles with a bonding metal or alloy and sintering the particles and metal or alloy under temperature and pressure conditions at which the cubic boron nitride is crystallographically stable "said pressure being in the range of 50 to 70 kilobars".

2. A method of claim 1 wherein the temperature used is in the range 1400° to 1600° C.

3. A method of claim 1 wherein the metal or alloy is in powdered form and a mixture is made of the carbide particles, the cubic boron nitride particles and the powdered alloy or metal.

4. A method of claim 1 wherein volatiles are removed from the particles and the metal or alloy which are then vacuum sealed prior to sintering.

5. A method of claim 4 wherein the volatiles are removed by heating the particles and the metal or alloy in a vacuum.

6. A method of claim 5 wherein the heating is carried out at a temperature in the range 500° C. to 1200° C. in a vacuum of 1mbar or less.

7. A method of claim 2 wherein the metal or alloy is in powdered form and a mixture is made of the carbide particles, the cubic boron nitride particles and the powdered alloy or metal.

8. A method of claim 2 wherein the volatiles are removed from the particles and the metal or alloy which are then vacuum sealed prior to sintering.

9. A method of claim 8 wherein the volatiles are removed by heating the particles and the metal or alloy in a vacuum.

10. A method of claim 9 wherein the heating is carried out in a temperature in the range 500° C. to 1200° C. in a vacuum of 1mbar or less.

* * * * *